United States Patent
Laird et al.

(10) Patent No.: US 10,116,129 B1
(45) Date of Patent: Oct. 30, 2018

(54) EOS EVENT DETECTION CIRCUIT FOR DETECTING EOS EVENT ON SUPPLY VOLTAGE RAIL COUPLED TO POWER SUPPLY

(71) Applicant: Western Digital Technologies, Inc., Irvine, CA (US)

(72) Inventors: William K. Laird, Corona, CA (US); Joseph J. Crowfoot, Irvine, CA (US)

(73) Assignee: WESTERN DIGITAL TECHNOLOGIES, INC., Irvine, CA (US)

(*) Notice: Subject to any disclaimer, the term of this patent is extended or adjusted under 35 U.S.C. 154(b) by 374 days.

(21) Appl. No.: 15/158,541

(22) Filed: May 18, 2016

(51) Int. Cl.
*H02H 9/00* (2006.01)
*H02H 1/00* (2006.01)
*H02H 3/22* (2006.01)
*H02H 7/20* (2006.01)

(52) U.S. Cl.
CPC ............ *H02H 1/0007* (2013.01); *H02H 3/22* (2013.01); *H02H 7/20* (2013.01)

(58) Field of Classification Search
CPC .................................................... H02H 1/0007
See application file for complete search history.

(56) References Cited

U.S. PATENT DOCUMENTS

| | | | |
|---|---|---|---|
| 4,081,853 A | 3/1978 | Wickson | |
| 6,710,995 B2 | 3/2004 | Knoedgen | |
| 6,724,591 B2 | 4/2004 | Clarey et al. | |
| 7,459,350 B2 * | 12/2008 | Hsieh | H01L 23/5258 257/E23.15 |
| 8,059,005 B2 | 11/2011 | Henricks et al. | |
| 8,238,068 B2 | 8/2012 | Shannon et al. | |
| 8,513,971 B2 | 8/2013 | Xie et al. | |
| 8,614,583 B2 | 12/2013 | Huang | |
| 9,224,566 B2 * | 12/2015 | Snowdon | H01H 85/46 |
| 9,355,971 B1 * | 5/2016 | Mallikarjunaswamy | H01L 23/5256 |
| 2005/0088794 A1 * | 4/2005 | Boerstler | H02H 9/046 361/103 |
| 2008/0137251 A1 * | 6/2008 | Lin | G11C 17/18 361/91.1 |
| 2010/0271738 A1 | 10/2010 | Tsai | |
| 2011/0050203 A1 | 3/2011 | Huang | |
| 2015/0333499 A1 | 11/2015 | Oppenheimer et al. | |

* cited by examiner

*Primary Examiner* — Stephen W Jackson
(74) *Attorney, Agent, or Firm* — Foley & Lardner LLP (57) ABSTRACT

An EOS event detection circuit coupled to a power supply via a supply voltage rail and comprising a plurality of sub-circuits coupled to the supply voltage rail, each sub-circuit comprising a first transistor, a Zener diode coupled between the supply voltage rail and a first terminal of the first transistor, and a fusible element coupled between a second terminal of the first transistor and the supply voltage rail, wherein the first transistor is configured to cause the fusible element to open when an EOS event occurring on the supply voltage rail exceeds a reverse breakdown voltage of the Zener diode, and wherein the Zener diode in each sub-circuit has a different reverse breakdown voltage.

29 Claims, 7 Drawing Sheets

EOS EVENT DETECTION CIRCUIT FOR DETECTING EOS EVENT ON SUPPLY VOLTAGE RAIL COUPLED TO POWER SUPPLY

BACKGROUND

Power devices typically provide regulated power to components in various electronic devices and data storage devices, such as hard disk drives (HDDs), hybrid drives, and solid state drives (SSDs). The power device may reside in an IC (e.g., a Power Large Scale Integration (PLSI) or power Application Specific Integrated Circuit (ASIC)) in the electronic device or data storage device in which it is housed, and receive its power from a power supply (e.g., a power supply in a host or a standalone power supply), which may receive its power from an AC power line. However, a voltage spike originating from the AC power line or the power supply itself may cause an electrical overstress (EOS) event to occur on a supply voltage rail of the power device and cause damage to power device or the data storage device or electronic device in which the power device resides.

When a damaged electronic device or data storage device is returned to the vendor or manufacturer, it is desirable to determine if the damaged was caused by an EOS event coming from a power supply that provides power to the device. However, if the EOS event does not cause burn marks or other visual indicator of damage, advanced failure analysis (FA) techniques may have to be performed (e.g., curve tracing many pins, performing X-ray or microscope analysis, or performing component level testing). However, performing the advanced FA techniques may be undesirably time consuming (e.g., they may take hours or even days to be performed).

BRIEF DESCRIPTION OF THE DRAWINGS

EOS event detection circuits and power devices that embody the various features of the invention will now be described with reference to the following drawings, in which.

DETAILED DESCRIPTION

Various embodiments of the invention are directed to providing an electrical overstress (EOS) event detection circuit configured to detect an EOS event on a supply voltage rail from a power supply coupled to the EOS event detection circuit, and provide a range of magnitude of the detected EOS event. In various embodiments of the invention, a power device (e.g., a PLSI or power ASIC) comprises an EOS event detection circuit comprises a plurality sub-circuits coupled to a supply voltage rail, which is coupled to a power supply (e.g., an external power supply) via a voltage supply line, where each sub-circuit comprises a Zener diode and a fusible element, and where the EOS event detection circuit is configured to detect an EOS event from the power supply on the supply voltage rail by causing the fusible element to blow open (or simply, to "open") if a magnitude of the EOS event is greater than a reverse breakdown voltage of a Zener diode in at least one of the sub-circuits. For example, the power device may reside in a data storage device (e.g., an HDD, a hybrid drive, or an SSD) or any electronic device in which detecting an occurrence of an EOS event on a supply voltage rail coupled to a power supply and determining a magnitude range of the detected EOS event is desired.

In certain embodiments, a power device may comprise two supply voltage rails coupled to a power supply via respective voltage supply lines and further comprise two EOS event detection circuits, where each EOS event detection circuit is configured to detect an EOS event from the power supply on one of the supply voltage rails. For example, one of the voltage supply lines may provide a low voltage (e.g., 5V) and the other voltage supply line may provide a high voltage (e.g., 12V) to the power device.

In various embodiments, an EOS event detection circuit comprises a plurality of sub-circuits coupled to a voltage supply rail, where each sub-circuit comprises a Zener diode coupled to a first transistor (e.g., a bipolar transistor) and a second transistor (e.g., a FET) coupled to a fusible element. When the magnitude of an EOS event on the voltage rail exceeds the reverse breakdown voltage of the Zener diode in at least one sub-circuit, the first transistor is configured to turn on and cause the second transistor to turn on and blow open the fusible element, thereby indicating that the EOS event has been detected by the EOS event detection circuit. For example, the fusible element may be a fusible resistor, a fusible link, or a combination of a resistor and a fusible link. In the EOS event detection circuit, each sub-circuit comprises a Zener diode having a different reverse breakdown voltage. In an embodiment, the fusible element in each sub-circuit has a resistance that is substantially the same. For example, the resistance of the fusible element in each sub-circuit may be within a selected tolerance (e.g., a 20% tolerance) of a target resistance.

In certain embodiments, an EOS event detection circuit comprises a plurality of sub-circuits coupled to a voltage supply rail, where each sub-circuit comprises a Zener diode coupled to a single transistor (e.g., a FET) that is coupled to a fusible element, where the EOS event detection circuit is configured to detect an EOS event on the voltage supply rail by causing the fusible element in at least one sub-circuit to open when the magnitude of the EOS event exceeds the reverse breakdown voltage of the Zener diode in the least one sub-circuit and causes the transistor to turn on.

In one embodiment of the invention, an EOS event detection circuit is coupled between a supply voltage rail and ground and comprises a plurality of sub-circuits, where each sub-circuit comprises a fusible element, and a curve tracer is coupled to the EOS event detection circuit to determine if the EOS event detection circuit has detected an EOS event on the supply voltage rail by setting the curve tracer to an appropriate low voltage scale to obtain an I-V curve representing the EOS event detection circuit on the display of the curve tracer. For example, the curve tracer may be coupled to the EOS event detection circuit by coupling probes from the curve tracer to respective supply voltage rail and ground contacts. A resistance obtained by measuring a slope in a linear portion of the I-V curve may be compared to an expected resistance associated with the EOS event detection circuit when the fusible element in each sub-circuit is not open (i.e., when it is conductive). When the measured resistance is greater than the expected resistance, a fusible element in at least one sub-circuit of the EOS event detection circuit is open, thereby indicating that the EOS event detection circuit has detected an EOS event on the supply voltage rail.

Various embodiments of the invention will now be described. These embodiments are presented by way of example only, and are not intended to limit the scope of the invention. Various omissions, substitutions and changes in the form of the methods and devices described herein may be made without departing from the spirit of the invention. To illustrate some of the embodiments, reference will now be made to the figures.

Figure 1:
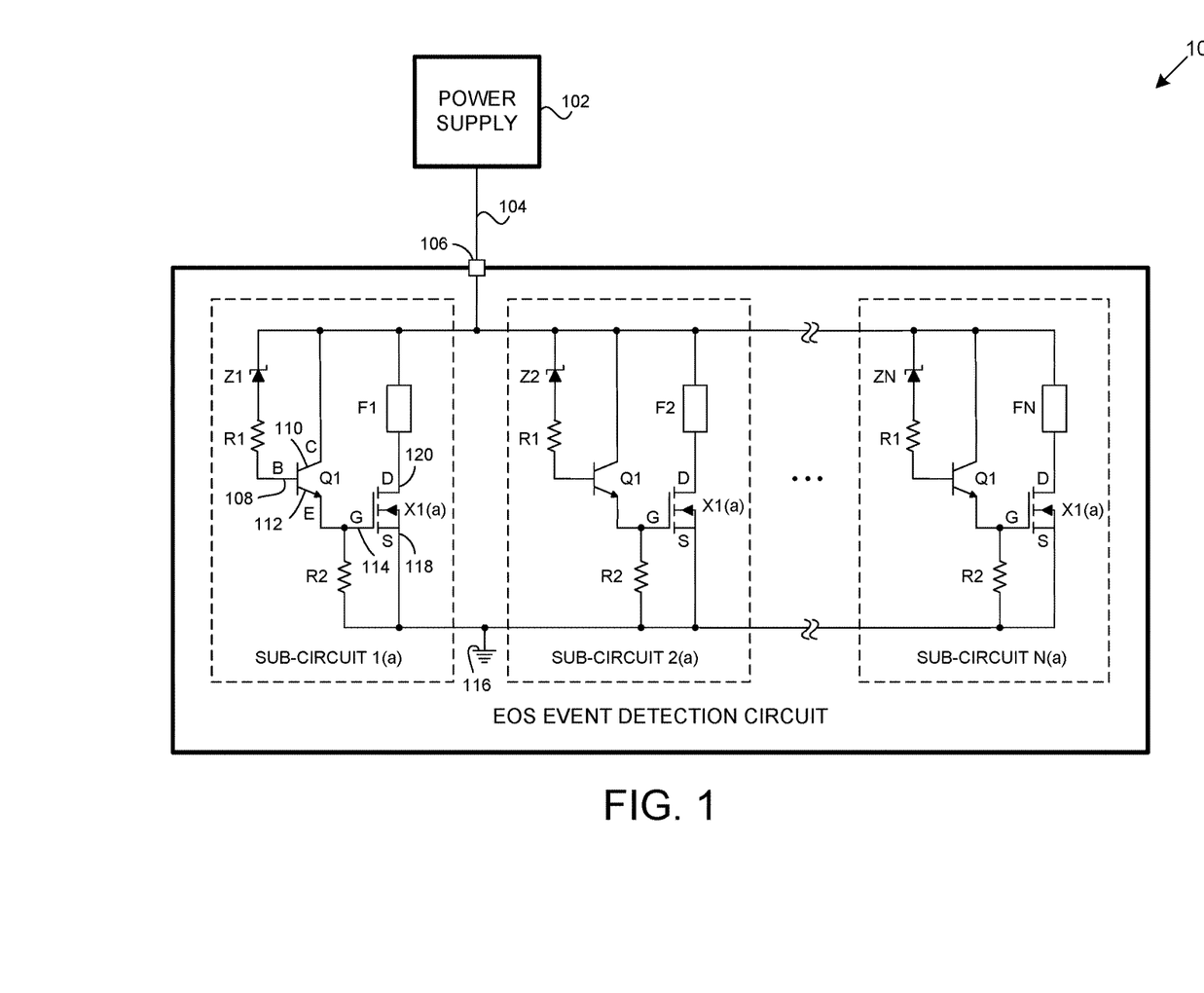
FIG. 1 is a diagram of an EOS event detection circuit coupled to a power supply and comprising a plurality of sub-circuit each comprising two transistors, in accordance with one embodiment of the invention.

FIG. 1 shows EOS event detection circuit 100 coupled to power supply 102 via supply voltage rail 104, in accordance with one embodiment of the invention. As shown in FIG. 1, EOS event detection circuit 100 comprises voltage input (VIN) port 106 for receiving a supply voltage from power supply 102 via supply voltage rail 104. In one embodiment, EOS event detection circuit 100 may reside in a power device in an electronic device or data storage device (e.g., an HDD, hybrid drive, or SSD). Power supply 102 may be, for example, a host power supply residing in a computing device, such as a desktop, laptop or tablet computer or be a standalone power supply. The supply voltage received from power supply 102 may be a low supply voltage (e.g., 5V or lower) or a high supply voltage (e.g., 12V), for example. EOS event detection circuit 100 may be utilized in an electronic device or data storage device to detect an EOS event from power supply 102 on supply voltage rail 104, and provide a range of magnitude of the detected EOS event.

As shown in the embodiment in FIG. 1, EOS event detection circuit 100 further comprises sub-circuits 1(a)-N(a), where each of sub-circuits 1(a)-N(a) is coupled to supply voltage rail 104 and comprises transistors Q1 and X1(a), resistors R1 and R2, a respective fusible element F1-FN, and a respective Zener diode Z1-ZN. As shown in FIG. 1, the cathode of Zener diode Z1 is coupled to supply voltage rail 104, the anode of Zener diode Z1 is coupled to base terminal 108 of transistor Q1 via resistor R1, collector terminal 110 of transistor Q1 is coupled to supply voltage rail 104 via VIN port 106, emitter terminal 112 of transistor Q1 is coupled to gate terminal 114 of transistor X1(a) and to ground 116 via resistor R2, source terminal 118 of transistor X1(a) is coupled to ground 116, and fusible element F1 is coupled between drain terminal 120 of transistor X1(a) and supply voltage rail 104. In the embodiment shown in FIG. 1, transistor Q1 may comprise a bipolar transistor (e.g., an NPN bipolar transistor). In another embodiment, transistor Q1 may comprise a different type of transistor (e.g., a FET). In one embodiment, transistor Q1 is not used and the anode of Zener diode Z1 is coupled to gate terminal 114 of transistor X1(a) via a resistor.

In the embodiment shown in FIG. 1, transistor X1(a) may comprise a FET (e.g., a MOSFET). In another embodiment, transistor X1(a) may comprise a different type of transistor (e.g., a bipolar transistor). In an embodiment in which transistor Q1 comprises a bipolar transistor and transistor X1(a) comprises a FET, for each sub-circuit 1(a)-N(a), the FET is selected to have a drain-source breakdown voltage that is greater than a sum of the reverse breakdown voltage of the Zener diode and a base-emitter turn-on voltage of the bipolar transistor. In the embodiment in FIG. 1, the resistance of resistor R1 is selected to cause transistor Q1 to turn on when reverse current is flowing through Zener diode Z1, and the resistance of resistor R2 is selected to appropriately bias gate terminal 114 of transistor X1(a) with respect to ground 116 to cause transistor X1(a) to turn on when transistor Q1 turns on. In one embodiment, resistor R2 is not used.

In the embodiment shown in FIG. 1, each of fusible elements F1-FN may comprise, for example, a fusible resistor, a fusible link, or a combination of a resistor and a fusible link, and has a resistance that is selected to cause it to open when transistor X1(a) turns on. In the embodiment shown in FIG. 1, each of fusible elements F1-FN in respective sub-circuits 1(a)-N(a) has substantially the same resistance. For example, each of fusible elements F1-FN may have a resistance that is within a selected tolerance (e.g. a 20% tolerance) of a target resistance. In the embodiment shown in FIG. 1, each of Zener diodes Z1-ZN has a different reverse breakdown voltage. In the embodiment shown in FIG. 1, the reverse breakdown voltages of Zener diodes Z1-ZN may be in any order, as long as each Zener diode Z1-ZN has a different reverse breakdown voltage. For example, Zener diode Z1 in sub-circuit 1(a) may have a higher reverse breakdown voltage than Zener diode Z2 in sub-circuit 2(a) but have a lower reverse breakdown voltage than Zener diode Z3 in sub-circuit 3(a).

During operation of EOS event detection circuit 100, an EOS event may arrive on supply voltage rail 104 from power supply 102. For example, the EOS event may originate from a voltage spike in power supply 102 or come from power supply 102 as a result of a voltage spike on AC transmission lines (not shown in FIG. 1) that provide AC power to power supply 102. The operation of sub-circuit 1(a) in the embodiment shown in FIG. 1 will now be discussed for the case in which the EOS event on supply voltage rail 104 has a magnitude greater than the reverse breakdown voltage of Zener diode Z1. However, the following discussion of the operation of sub-circuit 1(a) also applies to any other sub-circuit 1(a)-N(a) in EOS event detection circuit 100 that has a Zener diode with a reverse breakdown voltage that is lower than the magnitude of the EOS event. An EOS event having a magnitude that is less than the reverse breakdown voltage of any of Zener diodes Z1-ZN in sub-circuits 1(a)-N(a) will not be detected by EOS event detection 100.

Since the EOS event has a magnitude that exceeds the reverse breakdown voltage of Zener diode Z1, the EOS event breaks down Zener diode Z1, which causes a reverse current to flow through Zener diode Z1 (i.e., a current flows from the cathode to the anode of Zener diode Z1). The reverse current flowing through Zener diode Z1 flows through resistor R1 and causes transistor Q1 to turn on, which causes transistor X1(a) to turn on by providing a voltage at gate terminal 114 of transistor X1(a) that exceeds its threshold voltage. When transistor X1(a) turns on, it causes a current to flow from supply voltage rail 104 through fusible element F1 to ground 116, which causes fusible element F1 to open. By causing fusible element F1 to open, the detected EOS event would had to have a magnitude greater than the reverse breakdown voltage of Zener diode Z1. However, if the EOS event did not cause fusible element F1 to open, the EOS event would had to have a magnitude less than the reverse breakdown voltage of Zener diode Z1 in sub-circuit 1(a) and, therefore, would not have been detected by sub-circuit 1(a). In the embodiment shown in FIG. 1, EOS event detection circuit 100 detects an EOS event that appears on supply voltage rail 104 when the EOS event causes a fusible element F1-FN to open in at least one sub-circuit 1(a)-N(a).

In the case where an EOS event causes fusible element F1 in sub-circuit 1(a) to open but does not cause fusible element F2 in sub-circuit 2(a) to open, for example, the detected EOS event is determined to have a magnitude greater than the reverse breakdown voltage of Zener diode Z1 in sub-circuit 1(a) but less than the reverse breakdown voltage of Zener diode Z2 in sub-circuit 2(a). Thus, in the above example, sub-circuits 1(a) and 2(a) determine a range of magnitude of a detectable EOS event that corresponds to a difference between the reverse breakdown voltages of Zener diodes Z2 and Z1.

By way of further example, if EOS event detection circuit 100 has four sub-circuits with open fusible elements and one or more sub-circuits with fusible elements that are not open, a range of magnitude of a detected EOS event corresponds to a difference between the reverse breakdown voltage of the Zener diode having the lowest reverse breakdown voltage in the one or more sub-circuits with a fusible element that has not been opened and the reverse breakdown voltage of the Zener diode having the highest reverse breakdown voltage of the Zener diodes in the four sub-circuits having the fusible elements that have been opened by the EOS event. In the embodiment in FIG. 1, since each sub-circuit 1(a)-N(a) has a Zener diode Z1-ZN with a different reverse breakdown voltage, a magnitude range of a detected EOS event may be determined by knowing how many fusible elements F1-FN are open as a result of the detected EOS event.

Figure 2:
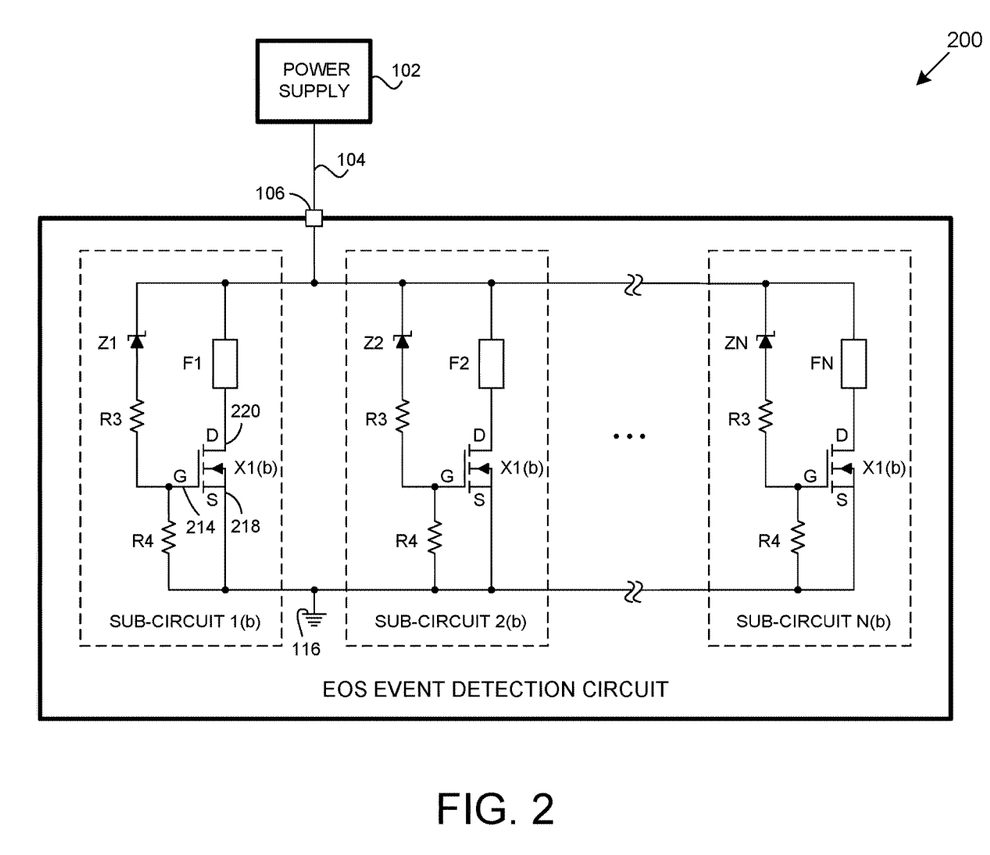
FIG. 2 is a diagram of an EOS event detection circuit coupled to a power supply and comprising a plurality of sub-circuit each comprising one transistor, in accordance with one embodiment of the invention.

FIG. 2 shows EOS event detection circuit 200 coupled to power supply 102 via supply voltage rail 104, in accordance with one embodiment of the invention. To avoid duplicate description and preserve brevity, only the differences between EOS event detection circuit 200 in FIG. 2 and EOS event detection circuit 100 in FIG. 1 will be described herein. EOS event detection circuit 200 may be utilized in an electronic device or data storage device to detect an EOS event from power supply 102 on supply voltage rail 104, and provide a range of magnitude of the detected EOS event. As shown in the embodiment in FIG. 2, EOS event detection circuit 200 comprises VIN port 106 for receiving a supply voltage from power supply 102 via supply voltage rail 104 and sub-circuits 1(b)-N(b), where each of sub-circuits 1(b)-N(b) is coupled to supply voltage rail 104 and comprises transistor X1(b), resistors R3 and R4, a respective fusible element F1-FN, and a respective Zener diode Z1-ZN. A primary difference between EOS event detection circuit 200 in FIG. 2 and EOS event detection circuit 100 in FIG. 1 is that transistor Q1 is not used in sub-circuits 1(b)-N(b) in EOS event detection circuit 200.

As shown in the embodiment in FIG. 2, the cathode of Zener diode Z1 in sub-circuit 1(b) is coupled to supply voltage rail 104, the anode of Zener diode Z1 is coupled to gate terminal 214 of transistor X1(b) via resistor R3, gate terminal 214 of transistor X1(b) is coupled to ground 116 via R4, source terminal 218 of transistor X1(b) is coupled to ground 116, and fusible element F1 is coupled between drain terminal 220 of transistor X1(b) and supply voltage rail 104. In the embodiment shown in FIG. 2, transistor X1(b) may comprise a FET (e.g., a MOSFET). In another embodiment, transistor X1(b) may comprise a different type of transistor (e.g., a bipolar transistor). In an embodiment in which transistor X1(b) comprises a FET, for each sub-circuit 1(b)-N(b), the FET is selected to have a drain-source breakdown voltage that is greater than the reverse breakdown voltage of the Zener diode in the sub-circuit. In the embodiment in FIG. 2, the resistance of resistors R3 and R4 are selected to cause transistor X1(b) to turn on when reverse current is flowing through Zener diode Z1. In one embodiment, resistor R4 is not used.

During operation of EOS event detection circuit 200, an EOS event may arrive on supply voltage rail 104 from power supply 102. The operation of sub-circuit 1(b) in the embodiment shown in FIG. 2 will now be discussed for the case in which the EOS event on supply voltage rail 104 has a magnitude greater than the reverse breakdown voltage of Zener diode Z1. If the magnitude of the EOS event on supply voltage rail 104 is not greater than the reverse breakdown voltage of Zener diode Z1, Zener diode Z1 will not breakdown and sub-circuit 1(b) will not detect the EOS event. The following discussion of the operation of sub-circuit 1(b) also applies to any other sub-circuit in EOS event detection circuit 200 that has a Zener diode that has a reverse breakdown voltage that is lower than the magnitude of the EOS event.

Since the EOS event has a magnitude that exceeds the reverse breakdown voltage of Zener diode Z1, the EOS event causes Zener diode Z1 to break down, which causes a reverse current to flow through Zener diode Z1. The reverse current flowing through Zener diode Z1 flows through resistor R3, which causes transistor X1(b) to turn on by providing a voltage at gate terminal 214 of transistor X1(b) that exceeds its threshold voltage. When transistor X1(b) turns on, it causes a current to flow from supply voltage rail 104 through fusible element F1 to ground 116, which causes fusible element F1 to open. By causing fusible element F1 to open, the detected EOS event has to have a magnitude greater than the reverse breakdown voltage of Zener diode Z1. In the embodiment shown in FIG. 2, EOS event detection circuit 200 detects an EOS event that appears on supply voltage rail 104 when the EOS event causes a fusible element F1-FN to open in at least one sub-circuit 1(b)-N(b).

Figure 3:
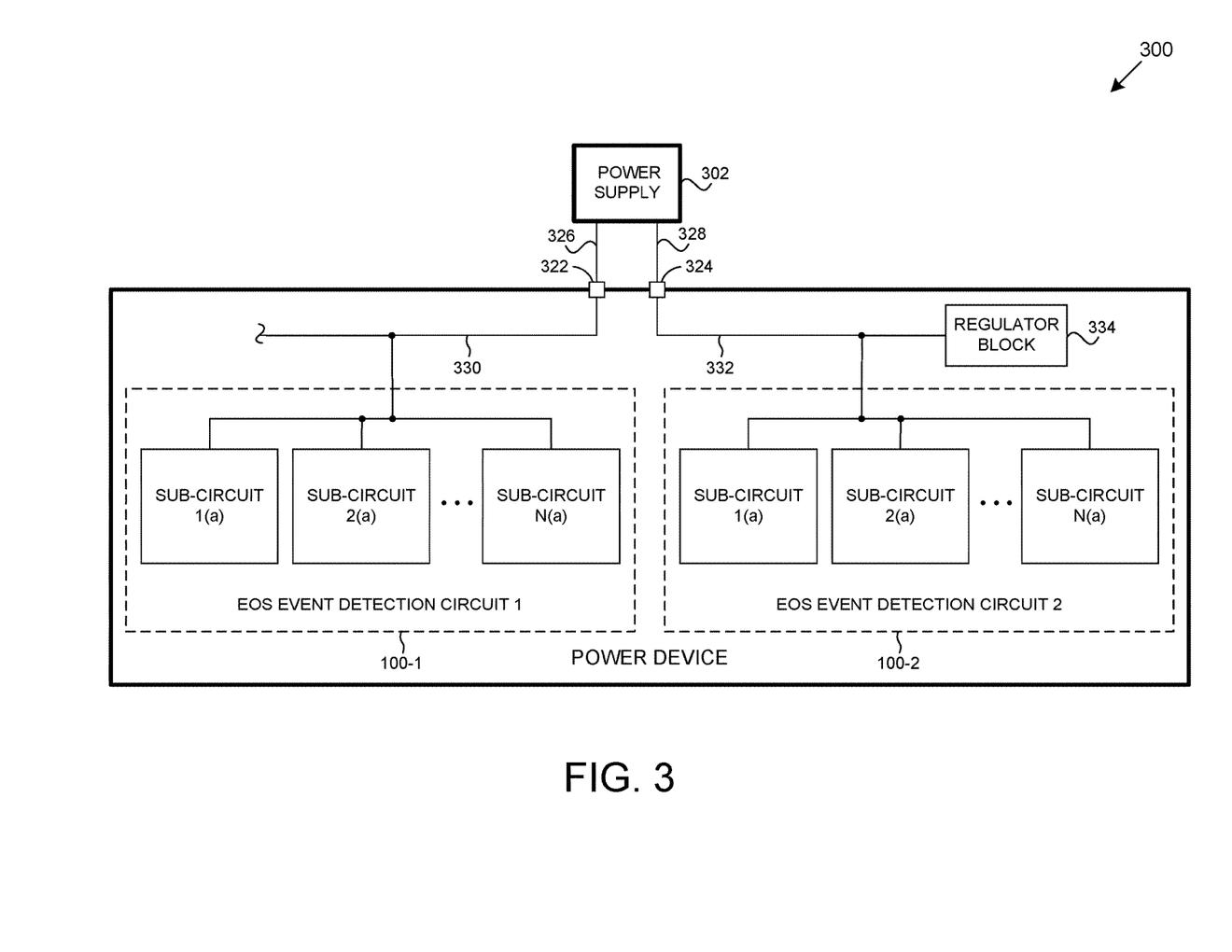
FIG. 3 is a block diagram of a power device coupled to a power supply and comprising two EOS event detection circuits (as shown in FIG. 1) coupled to separate supply voltage rails that are coupled to the power supply via separate voltage supply lines, in accordance with one embodiment of the invention.

FIG. 3 shows power device 300 coupled to power supply 302 and comprising two EOS event detection circuits coupled to different respective voltage supply lines of power supply 302, in accordance with one embodiment of the invention. As shown in FIG. 3, power device 300 comprises VIN port 322 for receiving a supply voltage from power supply 302 via voltage supply line 326, VIN port 324 for receiving a supply voltage from power supply 302 via voltage supply line 328, supply voltage rails 330 and 332, regulator block 334, and EOS event detection circuits 1 and 2. In the embodiment shown in FIG. 3, the supply voltage provided by power supply 302 via voltage supply line 326 is different than the supply voltage provided by power supply 302 via voltage supply line 328. For example, the supply voltage provided by power supply 302 via voltage supply line 326 may be a low supply voltage (e.g., 5V) and the supply voltage provided by power supply 302 via voltage supply line 328 may be a high supply voltage (e.g., 12V). For example, power device 300 may be an IC (e.g., a PLSI or a power ASIC). For example, power device 300 may reside in an electronic device or data storage device (e.g., an HDD, hybrid drive, or SSD).

As shown in the embodiment in FIG. 3, regulator block 334 is coupled to supply voltage rail 332 and provides one or more regulated voltages to power components (not shown in FIG. 3) that are coupled to power device 300. For example, if power device 300 resides in a data storage device (e.g., an HDD, hybrid drive, or SSD), regulator block 334 may provide one or more regulated voltages to power components in the data storage device (e.g., non-volatile memory and a controller). As shown in FIG. 3, EOS event detection circuit 1 is coupled to voltage supply line 326 via supply voltage rail 330 and comprises sub-circuits 1(a)-N(a), and EOS event detection circuit 2 is coupled to voltage supply line 328 via supply voltage rail 332 and comprises sub-circuits 1(a)-N(a). In the embodiment in FIG. 3, EOS event detection circuits 1 and 2 each correspond to EOS event detection circuit 100 in FIG. 1.

During operation of power device 300 in the embodiment shown in FIG. 3, when an EOS event appears on supply voltage rail 330 from power supply 302 via voltage supply line 326 and VIN port 322, the EOS event is detected by EOS event detection circuit 1 if the EOS event causes a fusible element F1-FN in at least one sub-circuit 1(a)-N(a) in EOS event detection circuit 1 to open. If the EOS event is detected by EOS event detection circuit 1, EOS event detection circuit 1 also provides a magnitude range of the EOS event. Similarly, when an EOS event appears on supply voltage rail 332 from power supply 302 via voltage supply line 328 and VIN port 324, the EOS event is detected by EOS event detection circuit 2 if the EOS event causes a fusible element F1-FN in at least one sub-circuit 1(a)-N(a) in EOS event detection circuit 2 to open. If the EOS event is detected by EOS event detection circuit 2, EOS event detection circuit 2 also provides a magnitude range of the EOS event.

Figure 4:
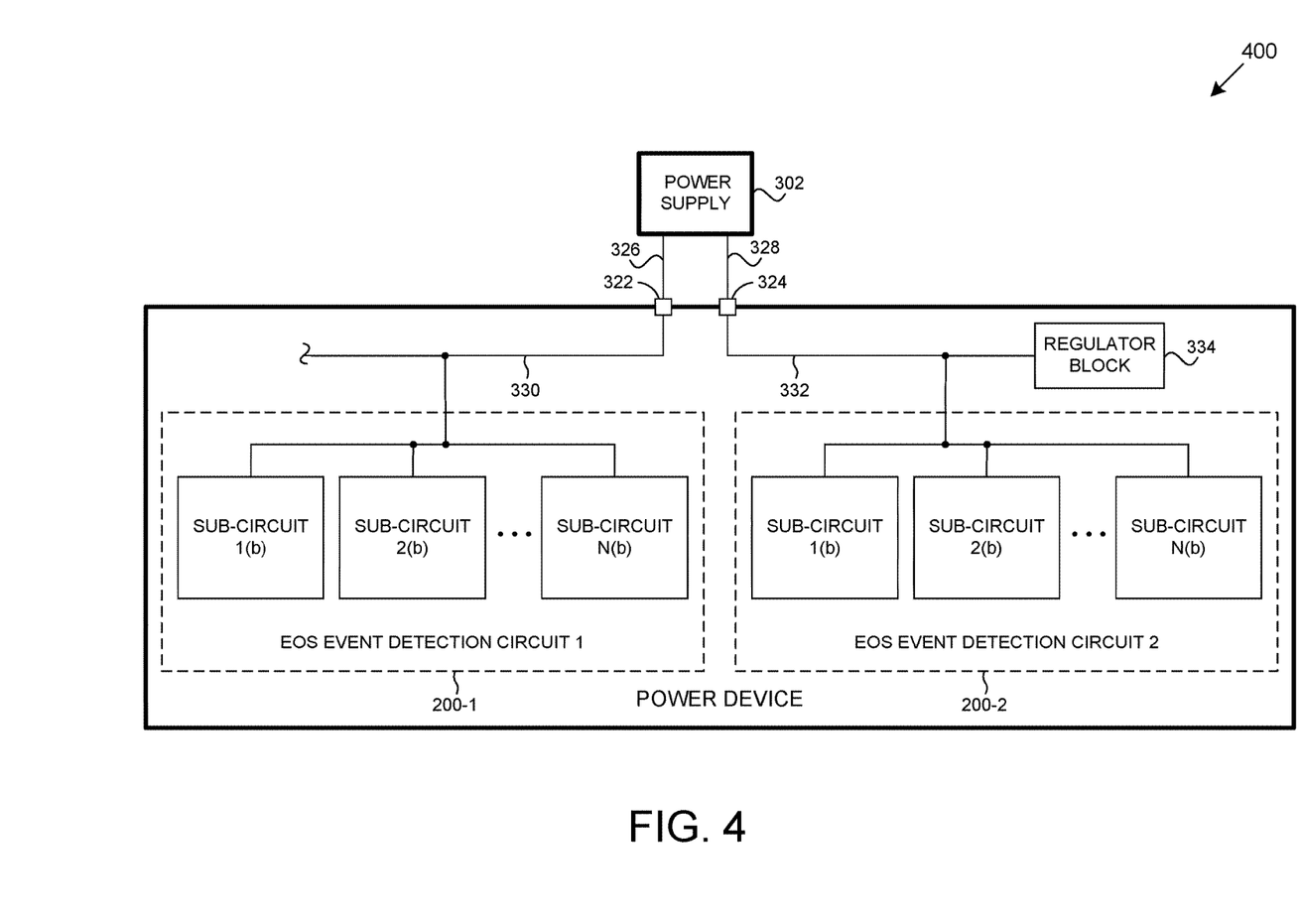
FIG. 4 is a block diagram of a power device coupled to a power supply and comprising two EOS event detection circuits (as shown in FIG. 2) coupled to separate supply voltage rails that are coupled to the power supply via separate voltage supply lines, in accordance with one embodiment of the invention.

FIG. 4 shows power device 400 coupled to power supply 302 and comprising two EOS event detection circuits coupled to different respective voltage supply lines of power supply 302, in accordance with one embodiment of the invention. To avoid duplicate description and preserve brevity, only the differences between power device 400 in FIG. 4 and power device 300 in FIG. 3 will be described herein. As shown in FIG. 4, power device 400 comprises VIN ports 322 and 324, supply voltage rails 330 and 332, regulator block 334, and EOS event detection circuits 1 and 2. In the embodiment in FIG. 4, EOS event detection circuits 1 and 2 each comprise sub-circuits 1(b)-N(b) and correspond to EOS event detection circuit 200 in FIG. 2.

During operation of power device 400 in the embodiment shown in FIG. 4, when an EOS event appears on supply voltage rail 330 from power supply 302 via voltage supply line 326 and VIN port 322, the EOS event is detected by EOS event detection circuit 1 if the EOS event causes a fusible element F1-FN in at least one sub-circuit 1(b)-N(b) in EOS event detection circuit 1 to open. If the EOS event is detected by EOS event detection circuit 1, EOS event detection circuit 1 also provides a magnitude range of the EOS event. Similarly, when an EOS event appears on supply voltage rail 332 from power supply 302 via voltage supply line 328 and VIN port 324, the EOS event is detected by EOS event detection circuit 2 if the EOS event causes a fusible element F1-FN in at least one sub-circuit 1(b)-N(b) in EOS event detection circuit 2 to open. If the EOS event is detected by EOS event detection circuit 2, EOS event detection circuit 2 also provides a magnitude range of the EOS event.

Figure 5:
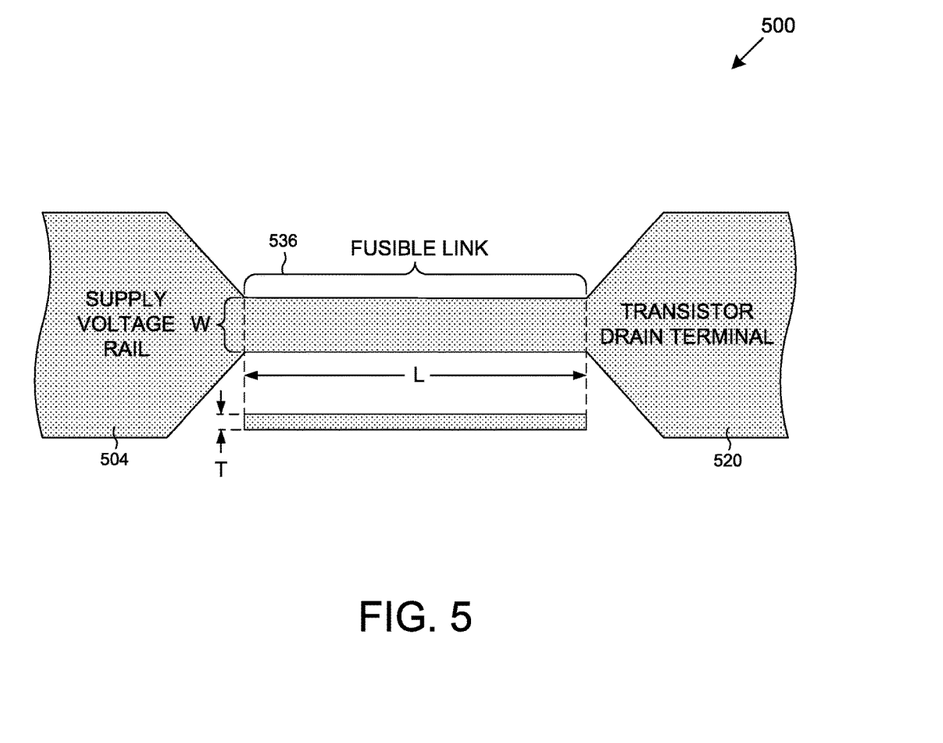
FIG. 5 is a diagram of a metal layer comprising a fusible link implementation of a fusible element in an EOS event detection circuit, in accordance with one embodiment of the invention.

FIG. 5 shows metal layer 500 comprising fusible link 536, in accordance with one embodiment of the invention. As shown in FIG. 5, fusible link 536 has width W, length L, and thickness T and shows an implementation of fusible element F1-FN in EOS event detection circuit 100 in FIG. 1 or EOS event detection circuit 200 in FIG. 2. As shown in FIG. 5, fusible link 536 is situated between supply voltage rail 504 and transistor drain terminal 520, which corresponds to drain terminal 120 of transistor X1(a) in EOS event detection circuit 100 in FIG. 1 or drain terminal 220 of transistor X1(b) in EOS event detection circuit 200 in FIG. 2. Width W of fusible link 536 is selected to cause fusible link 536 to open when an EOS event on supply voltage rail 504 causes a current to flow from supply voltage rail 504 through transistor drain terminal 520 to ground (not shown in FIG. 5). The resistance R of fusible link 536 is:

$$R = \rho * (L/(W*T))$$

where $\rho$ is the resistivity of metal layer 500, L is the length of fusible link 536 along a path of current flow, W is the width of fusible link 536, and T is the thickness of fusible link 536.

Figure 6A:
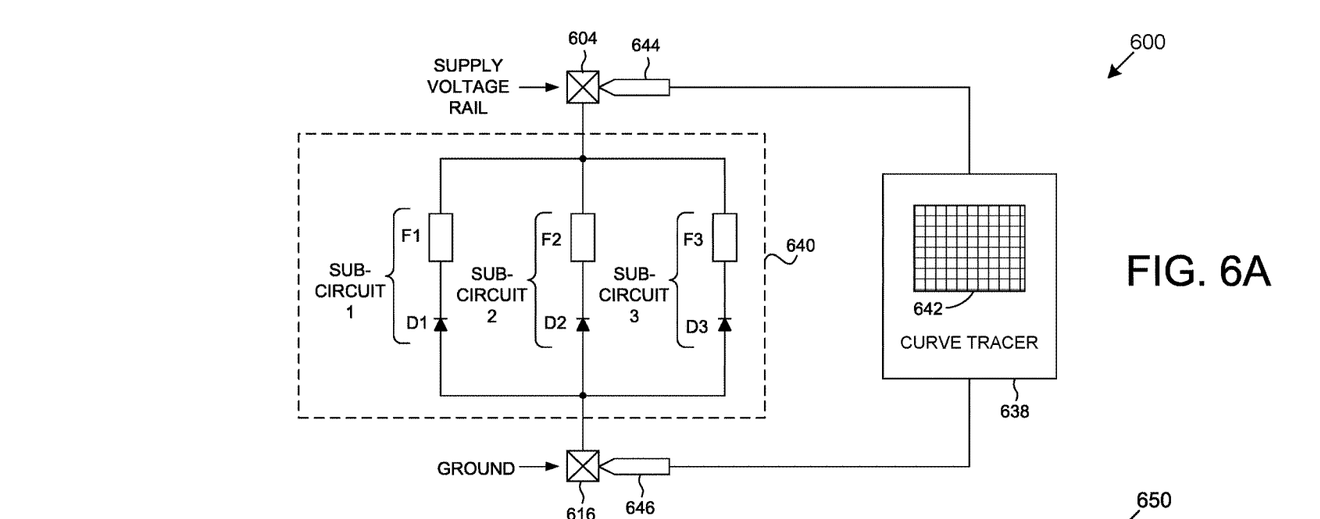
FIG. 6A is diagram of a test system comprising a curve tracer coupled to a circuit representing an EOS event detection circuit comprising three sub-circuits, in accordance with one embodiment of the invention.

FIG. 6A shows test system 600 comprising curve tracer 638 coupled to circuit 640, which represents an EOS event detection circuit comprising three sub-circuits, in accordance with one embodiment of the invention. In the embodiment shown in FIG. 6A, circuit 640 is a schematic representation of an EOS event detection circuit comprising sub-circuits 1-3 (e.g., EOS event detection circuit 100 comprising sub-circuits 1(a)-3(a) in FIG. 1 or EOS event detection circuit 200 comprising sub-circuits 1(b)-3(b) in FIG. 2) as seen by curve tracer 638 when it is set on an appropriate low voltage scale. As shown in FIG. 6A, circuit 640 is coupled between supply voltage rail contact 604 and ground contact 616 and comprises sub-circuit 1 comprising fusible element F1 and diode D1, sub-circuit 2 comprising fusible element F2 and diode D2, and sub-circuit 3 comprising fusible element F3 and diode D3. In circuit 640, diodes D1-D3 represent the respective body diodes of transistor X1(a) in sub-circuits 1(a)-3(a) in EOS event detection circuit 100 in FIG. 1 or the respective body diodes of transistor X1(b) in sub-circuits 1(b)-3(b) in EOS event detection circuit 200 in FIG. 2.

In the embodiment shown in FIG. 6A, curve tracer 638 is coupled to supply voltage rail contact 604 via probe 644 and coupled to ground contact 616 via probe 646 and comprises display 642, which may provide a visual representation of circuit 640. When curve tracer 638 is set to an appropriate low voltage scale, body diodes D1-D3 are in a conducting mode and have a very low resistance, which is substantially lower than the resistance of fusible elements F1-F3, and, consequently, may be ignored with respect to the resistance of fusible elements F1-F3. Thus, in the appropriate low voltage scale setting, curve tracer 638 can see the total resistance of sub-circuits 1-3 in circuit 640 as being substantially equal to the parallel resistances of fusible elements F1-F3. For example, if each of fusible elements F1-F3 have a resistance of 2.0 ohms and none of the fusible elements has been opened as a result of a detected EOS event, curve tracer 638 would see a resistance substantially equal to 0.67 ohms (i.e., the sum of three 2.0 ohm resistances in parallel).

Figure 6B:
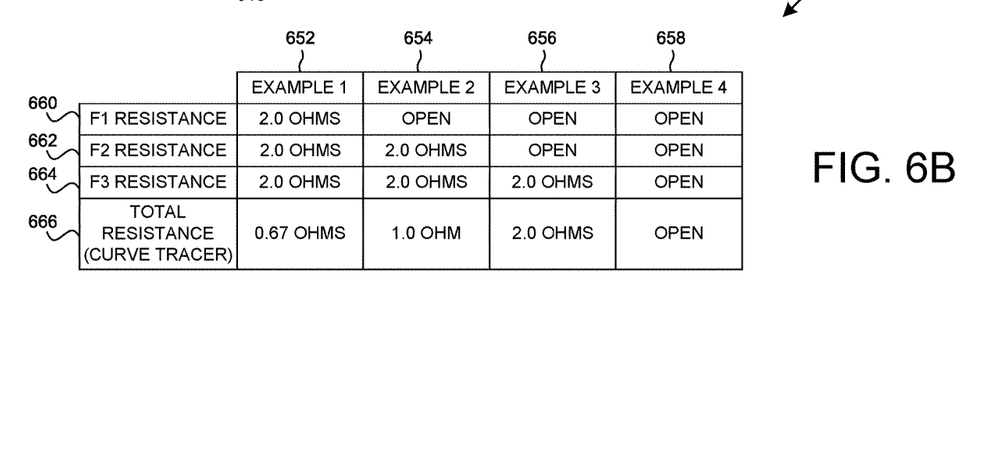
FIG. 6B is a table showing four examples of the total resistance of various combinations of open fusible elements in the circuit shown in FIG. 6A as determined by using the curve tracer shown in the test system in FIG. 6A, in accordance with one embodiment of the invention.

FIG. 6B shows table 650 including four examples of the total resistance of various combinations of open and unopened (i.e., conductive) fusible elements F1-F3 in circuit 640 in FIG. 6A, in accordance with one embodiment of the invention. As shown in FIG. 6B, table 650 comprises columns 652, 654, 656, and 658, where each column shows an example of a different combination of open and unopened fusible elements F1-F3 in circuit 640 (FIG. 6A) and the resulting total resistance of circuit 640 as seen by curve tracer 638 (FIG. 6A). In the four examples shown in table 650, a fusible element F1-F3 is designated as "open" in table 650 when it has been opened as a result of a detected EOS event on supply voltage rail 604 by an EOS event detection circuit represented by circuit 640 (FIG. 6A) and is designated as having an example resistance of 2.0 ohms if it has not been opened as a result of a detected EOS event on supply voltage rail 604.

Also seen in FIG. 6B, table 650 further comprises rows 660, 662, 664, and 666, where rows 660, 662, and 664 each show a respective resistance of fusible elements F1-F3 for each of examples 1-4, and where row 666 shows the total resistance of fusible elements F1-F3 in FIG. 6A in a parallel combination as seen by curve tracer 638 (FIG. 6A) for each of the four examples of different combinations of open and unopened fusible elements F1-F3. As shown in table 650 in FIG. 6B, example 1 (in column 652) shows that the total resistance is 0.67 ohms as seen by curve tracer 638 when each fusible element F1-F3 has an example resistance of 2.0 ohms and none of the fusible elements F1-F3 are open; example 2 (in column 654) shows that the total resistance is 1.0 ohm as seen by curve tracer 638 when one fusible element (e.g., fusible element F1) is open; example 3 (in column 656) shows that the total resistance as seen by curve tracer 638 is 2.0 ohms when two fusible elements (e.g., fusible elements F1 and F2) are open; and example 4 (in column 658) shows the total resistance as seen by curve tracer 638 to be open (i.e., infinite or unmeasurably high) when all three fusible elements F1-F3 are open.

In an embodiment of the invention in which each fusible element in each sub-circuit of an EOS event detection circuit has a substantially same resistance (a target resistance within a predetermine tolerance (e.g., within a 20% tolerance)), a curve tracer may be used to determine a total resistance of the fusible elements in the EOS event detection circuit. From the total resistance as determined by the curve tracer, the number of fusible elements that are open (if any) may be determined as a result of an occurrence of an EOS event on a supply voltage rail coupled to the EOS event detection circuit. When the resistance of the parallel combination of fusible elements as determined by the curve tracer indicates that at least one fusible element is open, which indicates that an EOS event has been detected by the EOS event detection circuit, the particular sub-circuit(s) of the EOS event detection circuit can then be determined, which enables a magnitude range of the detected EOS event to be determined, as discussed above.

Figure 6C:
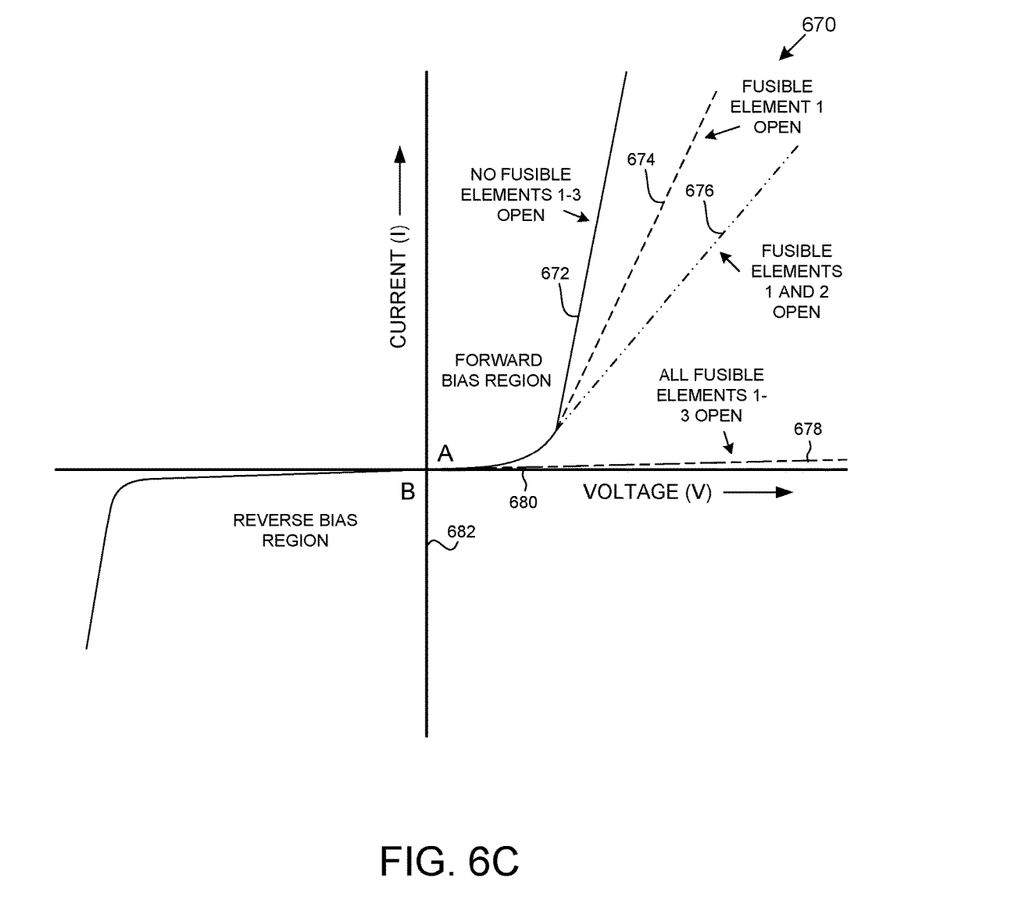
FIG. 6C is a graph showing four I-V curves corresponding to respective examples of combinations of open fusible elements as shown in the table in FIG. 6B and associated with the circuit representing an EOS event detection circuit shown in the test system in FIG. 6A, in accordance with one embodiment of the invention.

FIG. 6C shows graph 670 showing four I-V curves corresponding to respective examples 1-4 of combinations of open fusible elements F1-F3 as shown in table 650 in FIG. 6B and associated with circuit 640 in test system 600 in FIG. 6A, according to one embodiment of the invention. As shown in FIG. 6C, graph 670 comprises x-axis 680 (showing voltage) and y-axis 682 (showing current) and shows a forward bias region in quadrant A, a reverse bias region in quadrant B and I-V curves 672, 674, 676, and 678. Each of I-V curves 672, 674, 676, and 678 may be shown on display 642 on curve tracer 638 in test system 600 (FIG. 6A) (when curve tracer 638 is set to an appropriate low voltage range) and provide a visual representation of respective examples 1-4 in table 650 (FIG. 6B) showing different combinations of open fusible elements F1-F3 in circuit 640 (FIG. 6A), which is a schematic representation of an EOS event detection circuit comprising sub-circuits 1-3 as seen by curve tracer 638 (FIG. 6A). When each of I-V curves 672, 674, 676, and 678 is displayed on display 642 of curve tracer 638, the total resistance corresponding to row 666 in table 650 (FIG. 6B) corresponds to the slope of the I-V curve as measured in the linear region of the curve. For example, when I-V curve 674 corresponding to example 2 in table 650 is displayed on curve tracer 638, the total resistance of 1.0 ohm shown in row 666 of table 650 corresponds to the slope of I-V curve 674 as determined in the linear region of the curve.

While some embodiments of the invention have been described, these embodiments have been presented by way of example only, and are not intended to limit the scope of the disclosure. Indeed, the novel circuits and devices described herein may be embodied in a variety of other forms. Furthermore, various omissions, substitutions and changes in the form of the circuits and devices described herein may be made without departing from the spirit of the disclosure. For example, the various components described may be implemented as software and/or firmware on a processor, ASIC/FPGA, or dedicated hardware. As an additional example, some of the above described EOS event detection circuit embodiments may be implemented in electronic devices other than data storage devices.

Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of protection is defined only by the claims.

What is claimed is:

1. An EOS event detection circuit coupled to a power supply via a supply voltage rail, the EOS event detection circuit comprising:
    a plurality of sub-circuits coupled to the supply voltage rail, each sub-circuit comprising:
        a first transistor;
        a Zener diode coupled between the supply voltage rail and a first terminal of the first transistor; and
        a fusible element coupled between a second terminal of the first transistor and the supply voltage rail;
        wherein the first transistor is configured to cause the fusible element to open when an EOS event occurring on the supply voltage rail exceeds a reverse breakdown voltage of the Zener diode; and
        wherein the Zener diode in each sub-circuit has a different reverse breakdown voltage.

2. The EOS event detection circuit as recited in claim 1, wherein the fusible element in each sub-circuit has a substantially same resistance.

3. The EOS event detection circuit as recited in claim 1, wherein a number of fusible elements that are opened as a result of an occurrence of an EOS event on the supply voltage rail indicates range of magnitude of the EOS event.

4. The EOS event detection circuit as recited in claim 1, wherein the plurality of sub-circuits comprise a first sub-circuit comprising a Zener diode having a first reverse breakdown voltage and a second sub-circuit comprising a Zener diode having a second reverse breakdown voltage, and wherein the first and second sub-circuits determine a range of magnitude of detectable EOS events that corresponds to a difference between the first and second reverse breakdown voltages.

5. The EOS event detection circuit as recited in claim 1, wherein each sub-circuit further comprises a second transistor comprising a first terminal coupled to the Zener diode and a second terminal coupled to the first terminal of the first transistor, the second transistor configured to cause the first transistor to turn on when an EOS event occurring on the supply voltage rail exceeds the reverse breakdown voltage of the Zener diode.

6. The EOS event detection circuit as recited in claim 5, wherein the first transistor comprises a FET and the second transistor comprises a bipolar transistor, and wherein the FET is selected to have a drain-source breakdown voltage that is greater than a sum of the reverse breakdown voltage of the Zener diode and a base-emitter turn-on voltage of the second transistor.

7. The EOS event detection circuit as recited in claim 1, wherein the first transistor comprises a FET that is selected to have a drain-source breakdown voltage that is greater than the reverse breakdown voltage of the Zener diode.

8. The EOS event detection circuit as recited in claim 1, wherein, when an EOS event occurs on the voltage supply rail that exceeds the reverse breakdown voltage of the Zener diode in at least one sub-circuit, the occurrence and relative magnitude of the EOS event is determined by a resistance determined by a slope of an I-V curve provided on a curve tracer coupled between the voltage supply rail and ground.

9. The EOS event detection circuit as recited in claim 1, wherein the fusible element comprises a resistor.

10. The EOS event detection circuit as recited in claim 1, wherein the fusible element comprises a fusible link.

11. The EOS event detection circuit as recited in claim 1, wherein a third terminal of the first transistor is coupled to ground.

12. A power device coupled to a power supply via a voltage supply line, the power device comprising:
    a supply voltage rail coupled to the voltage supply line;
    an EOS event detection circuit coupled to the supply voltage rail and comprising:
        a plurality of sub-circuits coupled to the supply voltage rail, each sub-circuit comprising:
            a first transistor;
            a Zener diode coupled between the supply voltage rail and a first terminal of the first transistor; and
            a fusible element coupled between a second terminal of the first transistor and the supply voltage rail;
            wherein the first transistor is configured to cause the fusible element to open when an EOS event occurring on the supply voltage rail exceeds a reverse breakdown voltage of the Zener diode; and
            wherein the Zener diode in each sub-circuit has a different reverse breakdown voltage.

13. The power device as recited in claim 12, wherein the fusible element in each sub-circuit has a substantially same resistance.

14. The power device as recited in claim 12, wherein a number of fusible elements that are opened as a result of an occurrence of an EOS event on the supply voltage rail indicates a range of magnitude of the EOS event.

15. The power device as recited in claim 12, wherein the plurality of sub-circuits comprise a first sub-circuit comprising a Zener diode having a first reverse breakdown voltage and a second sub-circuit comprising a Zener diode having a second reverse breakdown voltage, and wherein the first and second sub-circuits determine a range of magnitude of detectable EOS events that corresponds to a difference between the first and second reverse breakdown voltages.

16. The power device as recited in claim 12, wherein each sub-circuit further comprises a second transistor comprising a first terminal coupled to the Zener diode and a second terminal coupled to the first terminal of the first transistor, the second transistor configured to cause the first transistor to turn on when an EOS event occurring on the supply voltage rail exceeds the reverse breakdown voltage of the Zener diode.

17. The power device as recited in claim 16, wherein the first transistor comprises a FET and the second transistor comprises a bipolar transistor, and wherein the FET is selected to have a drain-source breakdown voltage that is greater than a sum of the reverse breakdown voltage of the Zener diode and a base-emitter turn-on voltage of the second transistor.

18. The power device as recited in claim 12, wherein the first transistor comprises a FET that is selected to have a drain-source breakdown voltage that is greater than the reverse breakdown voltage of the Zener diode.

19. The power device as recited in claim 12, wherein, when an EOS event occurs on the voltage supply rail that exceeds the reverse breakdown voltage of the Zener diode in at least one sub-circuit, the occurrence and relative magnitude of the EOS event is determined by a resistance determined by a slope of an I-V curve provided on a curve tracer coupled between the voltage supply rail and ground.

20. A data storage device comprising the power device as recited in claim 12.

21. A power device coupled to a power supply via first and second voltage supply lines, the power device comprising:
    first and second supply voltage rails coupled to the respective first and second voltage supply lines;
    first and second EOS event detection circuits coupled to the respective supply voltage rails, each EOS event detection circuit comprising:
        a plurality of sub-circuits coupled to the respective supply voltage rail, each sub-circuit comprising:
            a first transistor;
            a Zener diode coupled between the respective supply voltage rail and a first terminal of the first transistor; and
            a fusible element coupled between a second terminal of the first transistor and the respective supply voltage rail;
            wherein the first transistor is configured to cause the fusible element to open when an EOS event occurring on the respective supply voltage rail exceeds a reverse breakdown voltage of the Zener diode; and
            wherein the Zener diode in each sub-circuit has a different reverse breakdown voltage.

22. The power device as recited in claim 21, wherein the fusible element in each sub-circuit has a substantially same resistance.

23. The power device as recited in claim 21, wherein a number of fusible elements that are opened as a result of an occurrence of an EOS event on the respective supply voltage rail indicates a range of magnitude of the EOS event.

24. The power device as recited in claim 21, wherein the plurality of sub-circuits comprise a first sub-circuit comprising a Zener diode having a first reverse breakdown voltage and a second sub-circuit comprising a Zener diode having a second reverse breakdown voltage, and wherein the first and second sub-circuits determine a range of magnitude of detectable EOS events that corresponds to a difference between the first and second reverse breakdown voltages.

25. The power device as recited in claim 21, wherein each sub-circuit further comprises a second transistor comprising a first terminal coupled to the Zener diode and a second terminal coupled to the first terminal of the first transistor, the second transistor configured to cause the first transistor to turn on when an EOS event occurring on the respective supply voltage rail exceeds the reverse breakdown voltage of the Zener diode.

26. The power device as recited in claim 25, wherein the first transistor comprises a FET and the second transistor comprises a bipolar transistor, and wherein the FET is selected to have a drain-source breakdown voltage that is greater than a sum of the reverse breakdown voltage of the Zener diode and a base-emitter turn-on voltage of the second transistor.

27. The power device as recited in claim 21, wherein the first transistor comprises a FET that is selected to have a drain-source breakdown voltage that is greater than the reverse breakdown voltage of the Zener diode.

28. The power device as recited in claim 21, wherein, when an EOS event occurs on the respective voltage supply rail that exceeds the reverse breakdown voltage of the Zener diode in at least one sub-circuit, the occurrence and relative magnitude of the EOS event is determined by a resistance determined by a slope of an I-V curve provided on a curve tracer coupled between the respective voltage supply rail and ground.

29. The power device as recited in claim 21, wherein the first and second voltage supply rails each receive a difference supply voltage from the power supply via the respective first and second voltage supply lines.

* * * * *